United States Patent
Gafvert

[11] Patent Number: 5,234,321
[45] Date of Patent: Aug. 10, 1993

[54] VARIABLE DISPLACEMENT HYDROSTATIC PUMP AND NEUTRAL RETURN MECHANISM THEREFOR

[75] Inventor: Sven B. Gafvert, Eden Prairie, Minn.
[73] Assignee: Eaton Corporation, Cleveland, Ohio
[21] Appl. No.: 895,533
[22] Filed: Jun. 8, 1992
[51] Int. Cl.⁵ .............. F04B 1/06; F01B 13/06; G05G 5/05
[52] U.S. Cl. .................. 417/219; 74/96; 74/470; 91/497; 92/12.1
[58] Field of Search ........... 417/218, 219, 220, 221; 92/12.1; 91/497; 74/96, 470, 516

[56] References Cited

U.S. PATENT DOCUMENTS

| | | | |
|---|---|---|---|
| 2,406,138 | 8/1946 | Ferris et al. | 91/497 |
| 2,673,526 | 3/1954 | Horton | 417/219 |
| 4,968,227 | 11/1990 | Szulczewski et al. | 91/497 |

FOREIGN PATENT DOCUMENTS

| | | | |
|---|---|---|---|
| 547964 | 10/1957 | Canada | 91/497 |
| 1936431 | 4/1981 | Fed. Rep. of Germany | 91/497 |

Primary Examiner—Richard A. Bertsch
Assistant Examiner—Roland McAndrews
Attorney, Agent, or Firm—L. J. Kasper

[57] ABSTRACT

A neutral centering spring mechanism (71) is provided for a variable displacement hydrostatic pump (25) of the type of which control of the displacement occurs in response to rotation of a control shaft (101;101'). Disposed about the control shaft is a pair of preferably identical actuator members (111,113), each of which is in engagement with a pin (115) such that clockwise rotation of the control shaft rotates one actuator member (111) while counter-clockwise rotation of the control shaft rotates the other actuator member (113). Each actuator member defines a movable stop surface (131,137), which are in engagement with fixed stop surfaces (133,139). A single torsion spring member (121) surrounds the actuator members, biasing both actuator members toward the neutral position. The neutral centering spring mechanism of the invention is relatively insensitive to manufacturing tolerances, is simple and inexpensive to manufacture, and may easily be disposed within the pump housing (29) where it is more protected from corrosion and damage, and is lubricated.

15 Claims, 8 Drawing Sheets

VARIABLE DISPLACEMENT HYDROSTATIC PUMP AND NEUTRAL RETURN MECHANISM THEREFOR

CROSS-REFERENCE TO RELATED APPLICATION

This application is related to co-pending application U.S. Ser. No. 07/895,536, filed on Jun. 8, 1992, in the name of Dennis Szulczewski for a "HYDROSTATIC TRANSAXLE ASSEMBLY AND IMPROVED COUPLING ARRANGEMENT THEREFOR", assigned to the assignee of the present invention.

BACKGROUND OF THE DISCLOSURE

The present invention relates to variable displacement hydraulic devices, and more particularly, to neutral centering mechanisms for use in returning the controls of such a device from either a first or second operating position, back to a neutral position.

Hydrostatic transmissions typically include variable displacement pump units, which include a fluid displacement mechanism, and some means operable to vary the displacement of the displacement mechanism in response to movement (typically rotation) of an input control member or control shaft. The present invention could also be used with a variable displacement motor unit, although the invention is especially adapted for use with a pump unit, and will be described in connection therewith.

Such variable displacement pump units are typically of the "over-center" type, i.e., the displacement mechanism may be displaced from a neutral position to either a first operating position (e.g., forward propel) or in the opposite direction to a second operating position (e.g., reverse propel). In such devices, it has proven to be very difficult to design and manufacture commercially acceptable control devices, by means of which the control shaft of the pump may be returned from either the first or second operating position to an "absolute neutral" position, i.e., a position of the control shaft corresponding to a 0 displacement of the pump. On a vehicle in which the hydrostatic pump is part of the vehicle propulsion system, failure to find neutral may result in the pump still displacing a small quantity of fluid, and the vehicle "creeping" at a low speed, even when the operator has moved the control linkage to what is apparently the neutral position.

As is well known to those skilled in the art, one of the primary difficulties in designing and manufacturing such a neutral centering mechanism is that, typically, the ability of the mechanism to return the control shaft to absolute neutral is dependent upon the ability to maintain very close manufacturing tolerances on one or more of the parts of the mechanism.

An attempt to overcome the problem of manufacturing tolerances, making it difficult to find absolute neutral, in a repeatable and predictable fashion, is set forth in U.S. Pat. No. 4,934,252, for a "VARIABLE DISPLACEMENT PUMP OR MOTOR AND NEUTRAL CENTERING MECHANISM THEREFOR", assigned to the assignee of the present invention.

Although the device successfully eliminated the tolerance sensitivity of the neutral centering mechanism, its commercial success was limited by its cost and complexity. Furthermore, the mechanism of the cited reference would seem inherently to require that it be located on the control shaft, external to the pump, thus permitting the mechanism to be subjected to corrosion and damage, and making it difficult to keep the mechanism properly lubricated.

SUMMARY OF THE INVENTION

Accordingly, it is an object of the present invention to provide an improved neutral centering mechanism for a variable displacement hydrostatic device, wherein the mechanism is largely insensitive to manufacturing tolerances of the various parts of the mechanism, while at the same time, being relatively simple and inexpensive to manufacture and assemble.

It is another object of the present invention to provide a neutral centering mechanism which accomplishes the above-stated object, and which may, conveniently, be located within the housing of the hydrostatic device, thereby protecting the mechanism from corrosion and damage, and facilitating lubrication of the mechanism.

It is an additional object of the present invention to provide such a neutral centering mechanism of the type which is adapted for adjustability.

The above and other objects of the invention are accomplished by the provision of a variable displacement hydraulic device of the type including a fluid displacement mechanism and means operable to vary the displacement in response to rotation of a control shaft about its axis of rotation, from a neutral position to a first operating position, and from a neutral position, in an opposite direction, to a second operating position. A control means is operatively associated with the control shaft to rotate it between the first and second operating positions. A neutral centering mechanism is operable to return the control shaft to its neutral position in the absence of actuation movement by the control means.

The neutral centering mechanism is characterized by the control shaft defining a reference plane oriented generally perpendicular to the axis of rotation defined by the control shaft. A means defining first and second fixed stop surfaces is disposed transversely adjacent the control shaft. First and second substantially identical actuator members are disposed about the control shaft and are arranged generally in a mirror image relative to each other, about the reference plane, the first and second actuator members defining first and second movable stop surfaces disposed to be in arrangement with the first and second fixed stop surfaces, respectively, when the control shaft is in its neutral position. The mechanism includes spring means biasing the first actuator member counter-clockwise, biasing the first movable stop surface toward engagement with the first fixed stop surface. The spring means biases the second actuator member clockwise, biasing the second movable stop surface toward engagement with the second fixed stop surface. Included is means operable to transmit clockwise rotation of the control shaft into clockwise rotation of the first actuator member, in opposition to the biasing force of the spring means. Also included is means operable to transmit counter-clockwise rotation of the control shaft into counter-clockwise of the second actuator member, in opposition to the biasing force of the spring means.

DESCRIPTION OF THE PREFERRED EMBODIMENTS

Figure 1:
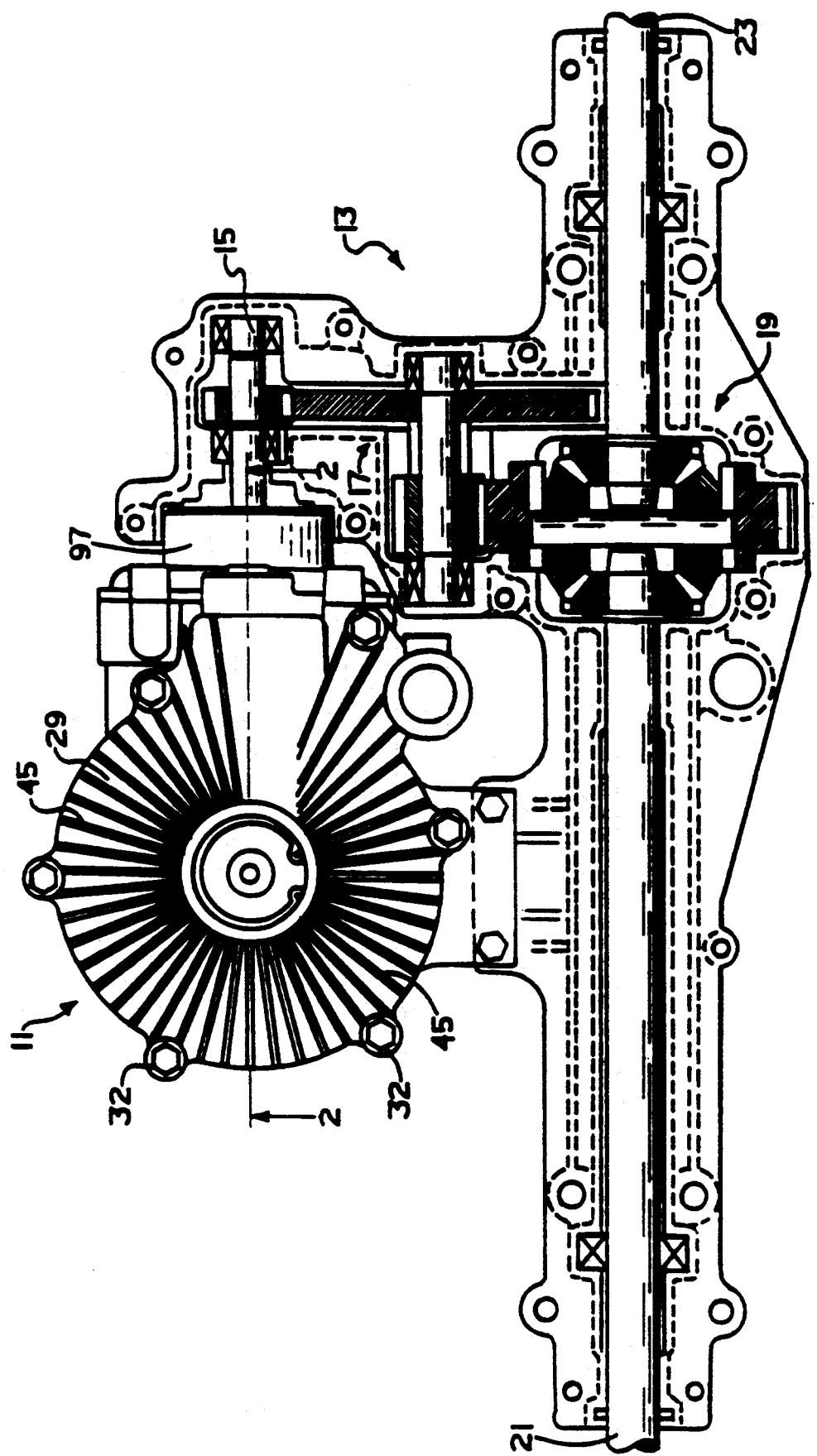
FIG. 1 is a view, partly in axial cross-section, and partly in plan view, of a hydrostatic transaxle of the type with which the present invention may be utilized.

Referring now to the drawings, which are not intended to limit the invention, FIG. 1 is a somewhat simplified view of a hydrostatic transaxle made in accordance with the present invention. The transaxle includes a hydrostatic transmission portion, generally designated 11, and an axle assembly, generally designated 13. In a typical application, torque is transmitted from the vehicle engine (not shown) to the hydrostatic transmission in a manner to be illustrated and described subsequently. The output torque of the hydrostatic transmission is transmitted by means of an output shaft 15 to an output gear train, generally designated 17. The torque is next transmitted to a differential gear set, generally designated 19, which divides the torque between a left axle shaft 21 and a right axle shaft 23. The left and right axle shafts 21 and 23 transmit drive torque to a pair of vehicle drive wheels (not shown) in a manner well known to those skilled in the art, and which forms no part of the present invention.

Figure 2:
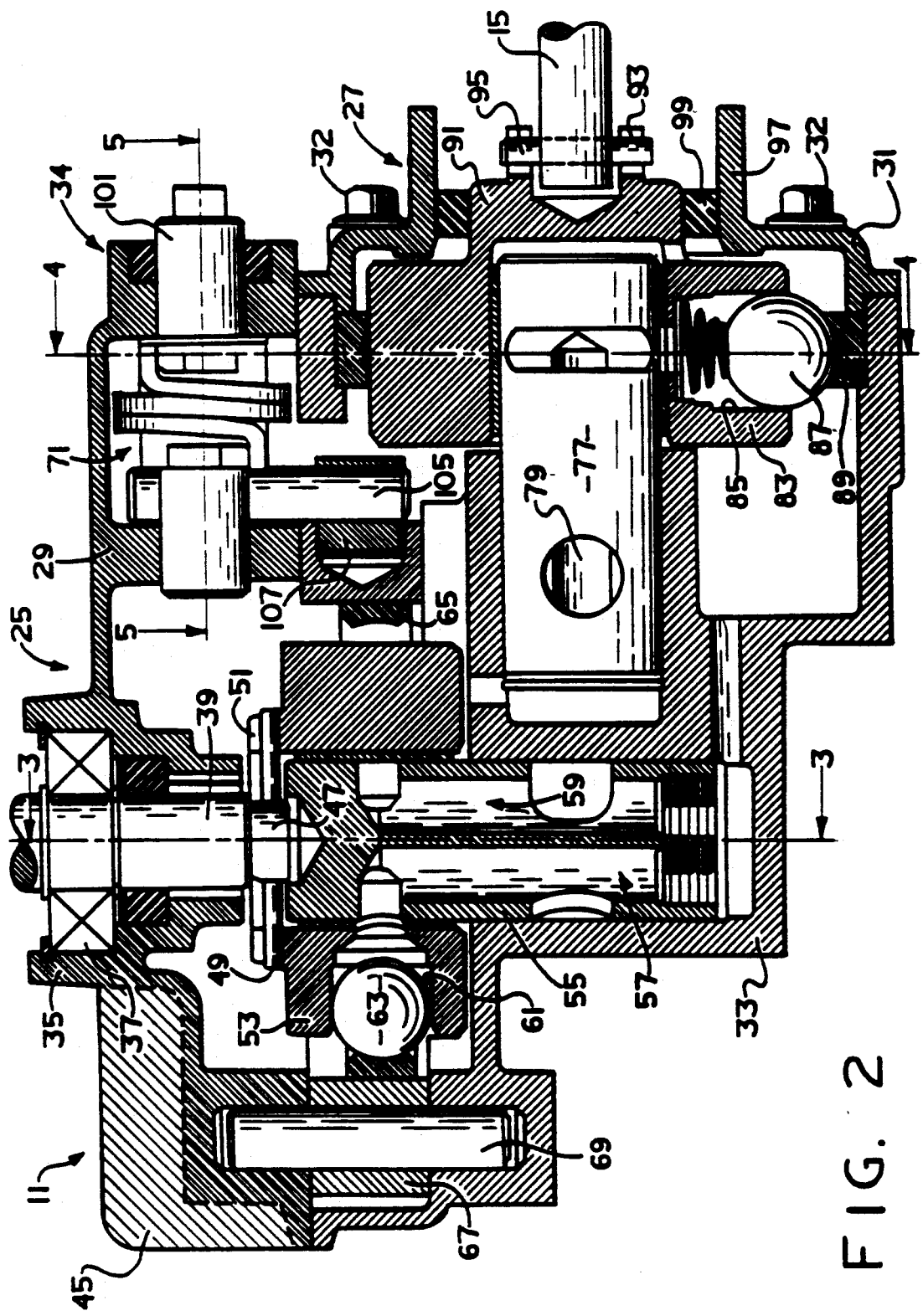
FIG. 2 is an enlarged, fragmentary transverse cross-section, taken on line 2—2 of FIG. 1, illustrating only the hydrostatic transmission portion of the transaxle of FIG. 1.

Referring now primarily to FIG. 2, the hydrostatic transmission 11 comprises, in a manner generally well known in the art, a hydrostatic pump, generally designated 25, and a hydrostatic motor, generally designated 27. The pump 25 includes a pump cover 29, while the motor 27 includes a motor cover 31, and the pump 25 and motor 27 share a common manifold body 33. The pump cover 29, motor cover 31, and manifold body 33 are joined together by a plurality of bolts 32 to form a hydrostatic transmission case, generally designated 34. Thus, the hydrostatic transmission 11, as shown in FIG. 2, comprises a self-contained, stand-alone unit.

Figure 3:
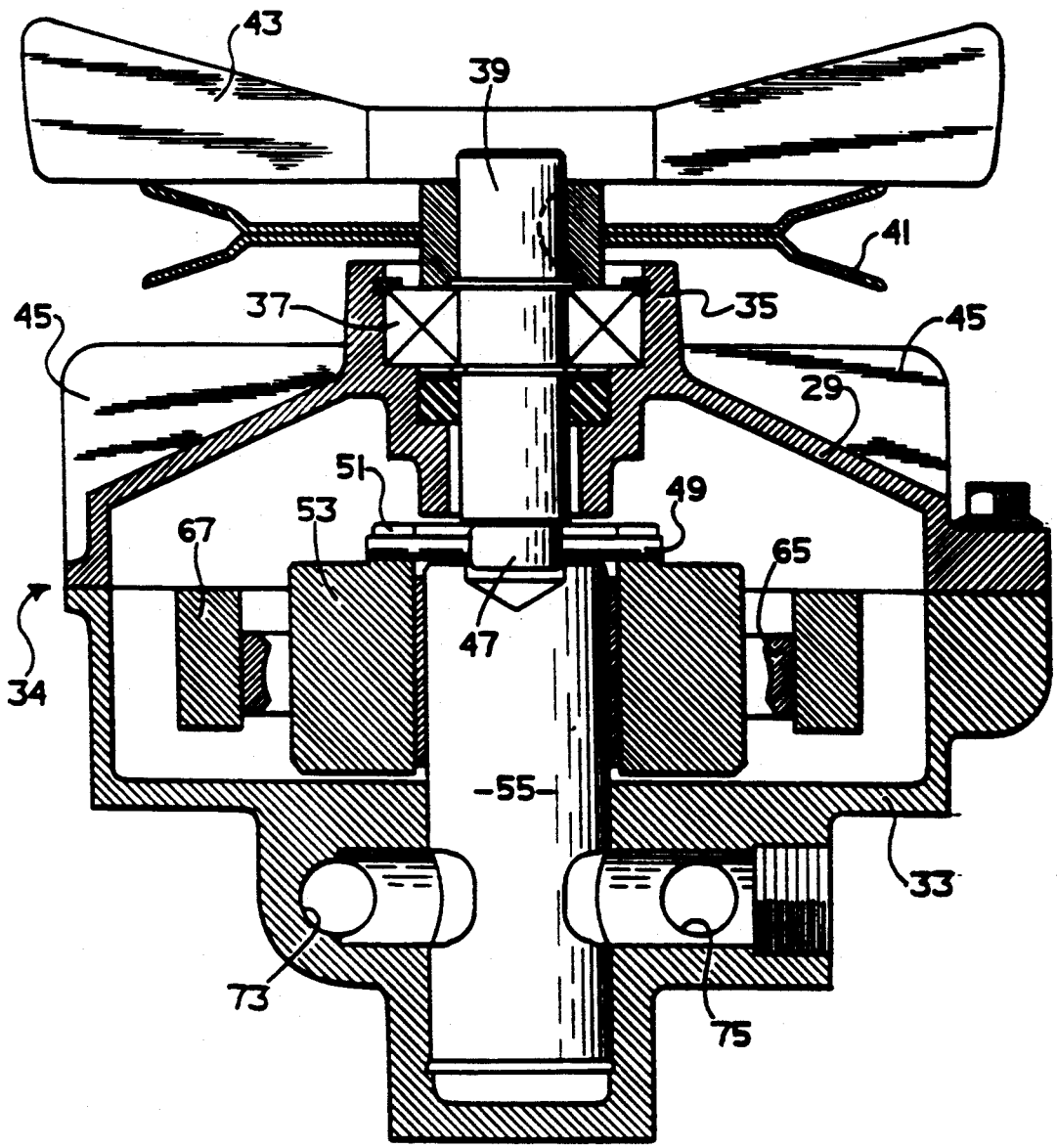
FIG. 3 is a transverse cross-section, taken on line 3—3 of FIG. 2, and on the same scale, but including an input pulley and cooling fan not shown in FIGS. 1 and 2.

Referring now to FIG. 3, in conjunction with FIG. 2, the pump cover 29 defines an input hub portion 35, within which is disposed a bearing set 37, and supported thereby is an input shaft 39. Keyed to the input shaft 39 is an input pulley 41, by means of which engine torque is transmitted (input) to the hydrostatic pump 25. Disposed on the upper end (in FIG. 3) of the input shaft 39 is a cooling fan 43, the purpose of which is to draw cooling air over a plurality of cooling fins 45 (see FIGS. 1, 2 and 3) which are preferably formed integrally with the pump cover 29. In the simplified view of FIG. 3, the pulley 41 and fan 43 are illustrated as comprising separate elements, but the pulley and fan could be formed as a single, integral part.

At its inner end (bottom end in FIGS. 2 and 3), the input shaft 39 includes a terminal portion 47 through which a drive pin 49 extends, transverse to the axis of rotation of the pump 25 and input shaft 39. The drive pin 49 engages a cut-out portion 51 of a pump rotor 53, whereby rotation of the input shaft 39 drives the rotor 53. The pump rotor 53 is disposed about a cylindrical support member 55 which is press-fit into a cylindrical bore in the manifold body 33. The support member 55 defines a pair of axially-extending bores 57 and 59 (see FIG. 2), the bore 57 comprising a low pressure inlet passage, and the bore 59 comprising a high pressure outlet passage. If the direction of rotation of the input shaft 39 were reversed, the bore 57 would be the high pressure outlet passage, and the bore 59 would be the low pressure inlet passage.

The pump rotor 53 defines a plurality of cylinder bores 61, and disposed within each bore 61 is a piston or ball 63, the balls 63 being in engagement with, and restrained in their radial travel, by a concave surface on a race member 65, which is disposed within a cam ring 67. The cam ring 67 is disposed to pivot about the axis of a cam pivot pin 69, the pin 69 being received within a pair of aligned bores defined by the pump cover 29 and manifold body 33. As is generally well known to those skilled in the art, pivotal movement of the cam ring 67 varies the displacement and output fluid flow of the pump 25, for any given input speed. Pivotal movement cf the cam ring 67 about the axis of the pivot pin 69 is accomplished by means of a displacement control assembly, generally designated 71, which will be described subsequently. The assembly 71 will also be referred to hereinafter, and in the appended claims, as a neutral centering mechanism. It will be understood by those skilled in the art that part of the function of the displacement control is to re-center the control in the neutral position after actuation of the rotary input ceases.

As the input shaft 39 rotates, the pump rotor 53 rotates. Some of the balls 63 move radially outward in their respective cylinder bores 61, drawing inlet fluid from the bore 57. At the same time, certain of the balls 63 are being displaced radially inwardly, thus pumping pressurized fluid through their respective cylindrical bores 61 into the bore 59. Referring still to FIGS. 2 and 3, the manifold body 33 defines a pair of axially-extending bores 73 and 75 which are in communication with the bores 57 and 59, respectively. Thus, high pressure fluid is pumped through the bore 75 to the motor 27.

In the subject embodiment, the hydrostatic motor 27 is a fixed-displacement motor, but is otherwise of the same general construction as the pump 25. Thus, the motor 27 includes a cylindrical support member 77 which is press-fit into the manifold body 33. The support member 77 defines an axially-extending bore 79, which communicates low pressure, exhaust fluid from the motor 27 back through the bore 73 and bore 57 to the inlet side of the pump 25. The support member 77 also defines an axially-extending bore 81 (see FIG. 4)

which communicates high pressure fluid from the bore 59 through the bore 75 to the motor 27.

Rotatably supported on the support member 77 is a motor rotor 83 which defines a plurality of cylinder bores 85, with a piston or ball 87 being disposed reciprocally within each of the bores 85. The balls 87 are restrained in their radial travel by a concave surface of a race member 89, the race member 89 being seated within a recess in the manifold body 33, and restrained axially therein by the motor cover 31.

Figure 4:
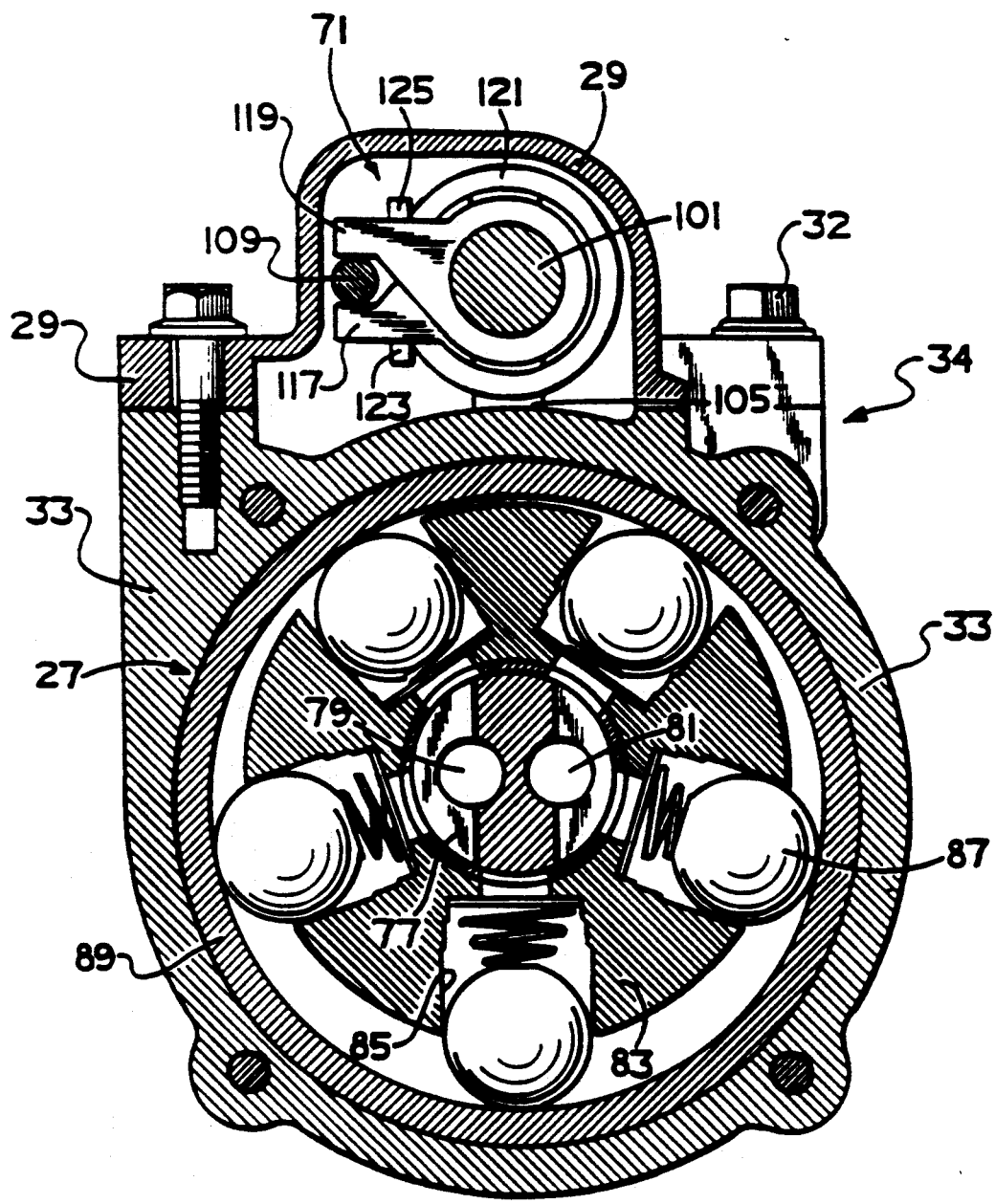
FIG. 4 is a transverse cross-section, taken on line 4—4 of FIG. 2, and on the same scale.
Figure 5:
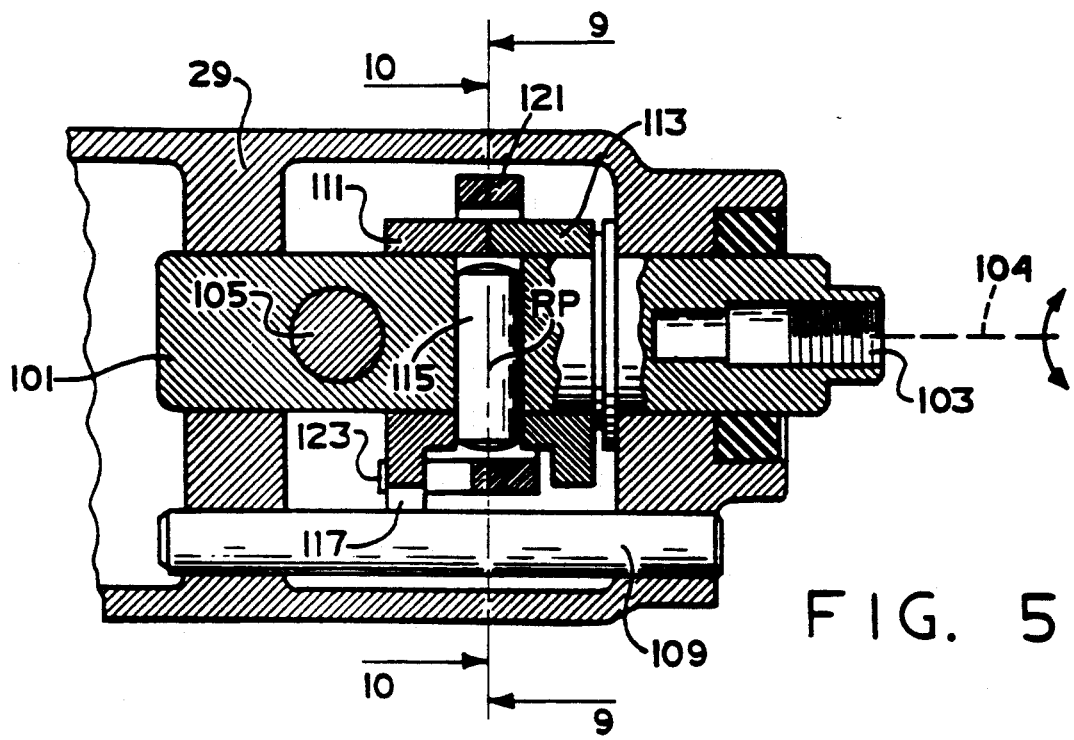
FIG. 5 is a further enlarged, fragmentary, axial cross-section taken on line 5—5 of FIG. 2, illustrating the neutral centering mechanism of the present invention.

The motor rotor 83 includes an output portion 91 which defines a cut-out portion 93, in which is disposed a drive pin 95. The drive pin 95 extends through the output shaft 15, whereby rotation of the rotor 83 is transmitted to the output shaft 15. Preferably, the cut-out portion 93 is generally U-shaped, and extends to the end (right end in FIG. 2) of the output portion 91, so that the output shaft 15 and the drive pin 95 are able to move axially relative to the output portion 91 during assembly and disassembly. The motor cover 31 includes an output hub portion 97, and disposed radially between the output portion 91 of the rotor and the hub portion 97 is a seal member 99. Referring now primarily to FIGS. 2, 4, and 5, the neutral centering mechanism 71 will be described in greater detail. A control shaft 101 extends axially through a pair of cylindrical openings in the pump cover 29, and is supported for rotation therein. The control shaft 101 includes, at its outer end, a threaded opening 103, adapted for engagement with some sort of control means, schematically represented in FIG. 5 as a rotatable linkage 104, of the type well known in the art. Appropriate movement of the linkage 104 rotates the control shaft 101 about its axis of rotation, thereby causing angular displacement of a pin 105 which, as may be seen in FIG. 2, is received in an opening defined by a cylindrical connector 107, disposed within a cylindrical opening in the cam ring 67. Thus, rotation of control shaft 101 results in pivotal movement of the cam ring 67 about the axis of the pivot pin 69, in a known manner, to vary the displacement of the pump 25.

Referring now primarily to FIG. 5, an elongated pin 109 is disposed within a pair of openings in the pump cover 29 and is oriented generally parallel to the axis of rotation of the control shaft 101. The function of the pin 109 will be described subsequently. Disposed about the control shaft 101 is a pair of identical actuator members 111 and 113, which are arranged in a mirror image of each other about an axis of a pin 115, which is slip-fit into a transverse bore in the control shaft 101, such that one end of the pin 115 extends out of the control shaft as shown in FIG. 5.

The actuator member 111 includes a stop portion 117, which engages an underside of the pin 109 in FIG. 4, while the actuator member 113 includes a stop portion 119 which engages the top surface of the pin 109. Disposed about the actuator members 111 and 113 is a torsion spring 121 having one end 123 engaging the stop portion 117, and another end 125 engaging the stop portion 119. Rotation of the control shaft 101 in a counter-clockwise direction, as viewed in FIG. 4, will cause the pin 115 to rotate the actuator member 111 counterclockwise, in opposition to the biasing force of the spring 121, thus varying the displacement of the pump 25 in one direction (e.g., forward propel). On the other hand, rotation of the control shaft 101 in the clockwise direction, as viewed in FIG. 4, will cause the pin 115 to move the actuator member 113 clockwise, in opposition to the biasing force of the spring 121, displacing the pump 25 in the opposite direction (e.g., reverse propel).

Figure 6:
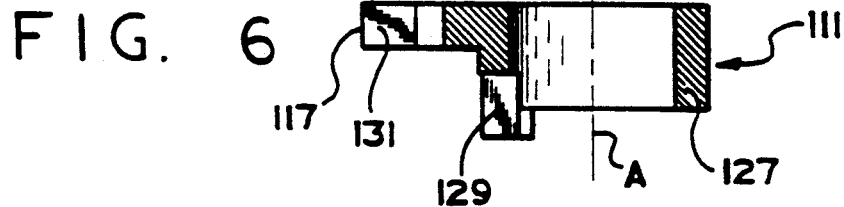
FIGS. 6 through 8 are various plan views of one of the actuator members of the neutral centering mechanism of the present invention.
Figure 8:
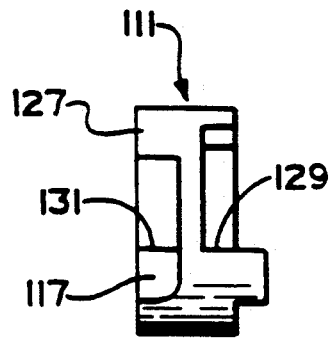
Figure 7:
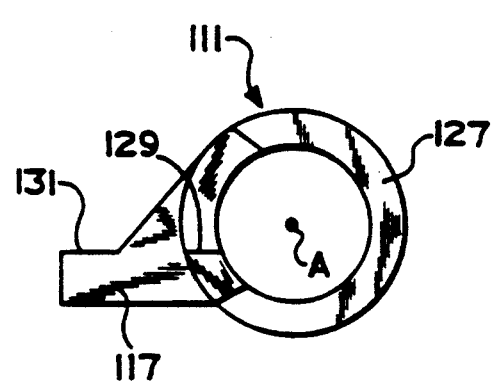
Figure 9:
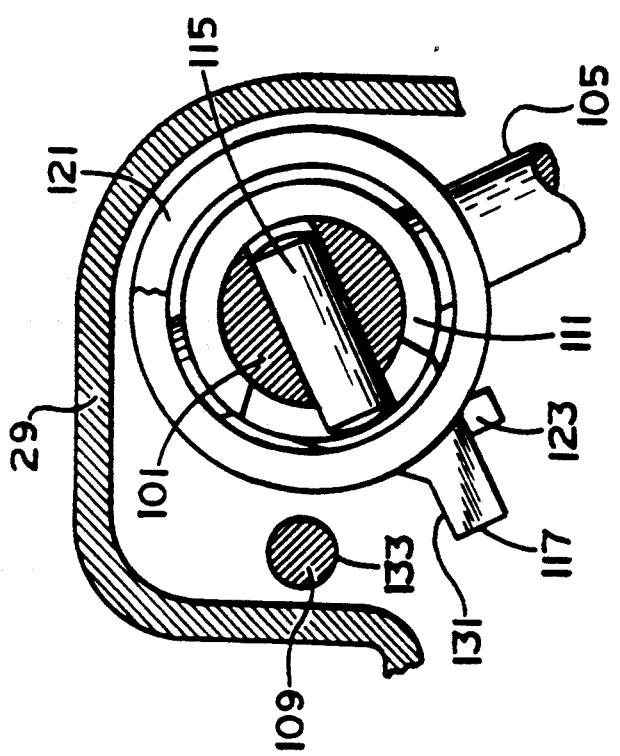

Referring now primarily to FIGS. 6 through 8, the actuator member 111 will be described in somewhat greater detail, it being understood that the actuator member 113 is preferably substantially identical, thus minimizing the number of different parts which make up the mechanism 71. The actuator member 111 comprises a generally annular portion 127 from which the stop portion 117 projects radially. The annular portion 127 defines an axis of rotation A (see FIGS. 6 and 7) intended to be substantially coincident with the rotation of control shaft 101. The annular portion 127 defines an actuation surface 129, against which the pin 115 acts to rotate the actuator member 111 to the position shown in FIG. 9. Finally, the stop portion 117 defines a movable stop surface 131 which, when the mechanism is in the neutral position of FIG. 4, is in engagement with the underside of the pin 109, the underside comprising a fixed stop surface 133, the surface 131 being referred to as "movable" only because it is part of the actuator member 111, which is rotatable relative to the pin 109.

Figure 10:
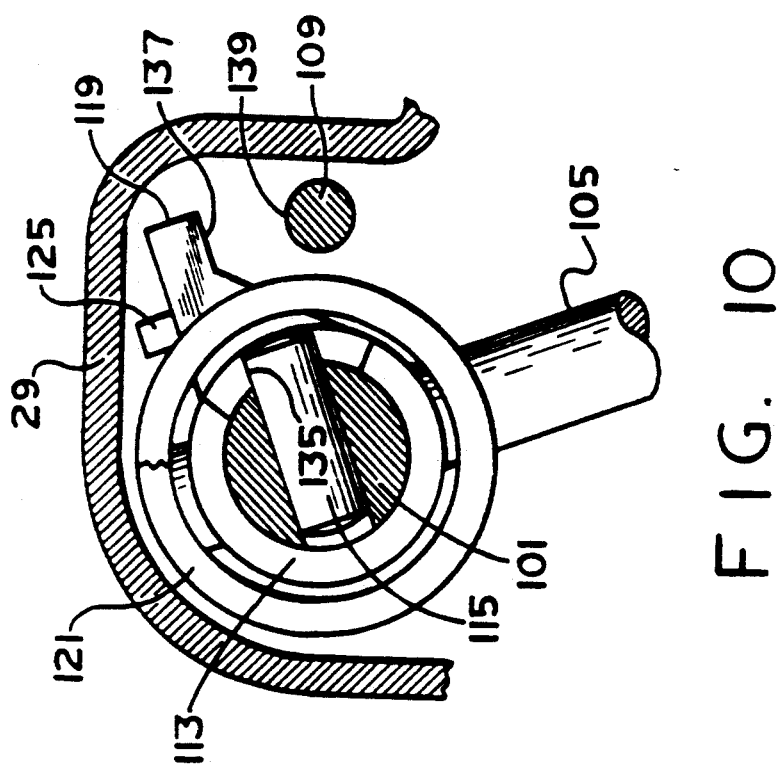
FIGS. 9 and 10 are transverse cross-sections taken on line 9—9 and 10—10, respectively, of FIG. 5, illustrating the operating positions of the neutral centering mechanism.

Referring now primarily to FIG. 10, the identical actuator member 113 defines an actuation surface 135, which is in engagement with the pin 115 in FIG. 10. The stop portion 119 defines a movable stop surface 137 which, in the neutral position shown in FIG. 4, is in engagement with the top surface of the pin 109, the top surface comprising a fixed stop surface 139.

Preferably, the diameters of the pins 109 and 115 are substantially identical, i.e., they are the same within normal manufacturing tolerances. It is also preferable that the actuation surface 129 and movable stop surface 131, defined by the actuator member 111 be co-planar. Similarly, the actuation surface 135 and the movable stop surface 137, defined by the actuator member 113, are co-planar. If the foregoing conditions are met, the result will be a neutral centering mechanism in which the movable stop surface 131 engages the fixed stop surface 133 at the same time that the movable surface 137 engages fixed stop surface 139. The illustrated arrangement makes it possible to achieve neutral centering in a repeatable and predictable manner, and with only a single spring member 121.

When using the embodiment of the present invention just described, wherein the fixed stop surfaces 133 and 139 are truly "fixed" relative to the pump cover 29, it may be necessary to utilize some sort of "wideband neutral" arrangement. See, for example, U.S. Pat. No. 4,968,227 for a "VARIABLE DISPLACEMENT FLUID PUMP WITH IMPROVED WIDEBAND NEUTRAL", assigned to the assignee of the present invention and incorporated herein by reference.

Figure 11:
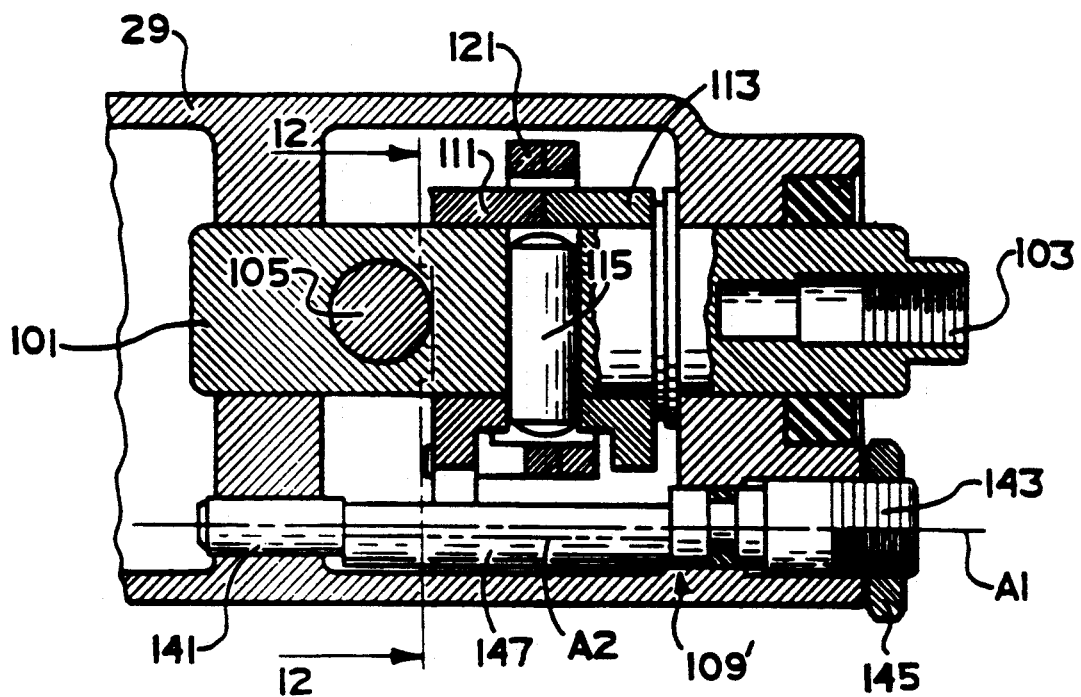
FIG. 11 is a view, similar to FIG. 5, illustrating an alternative embodiment of the present invention.
Figure 12:
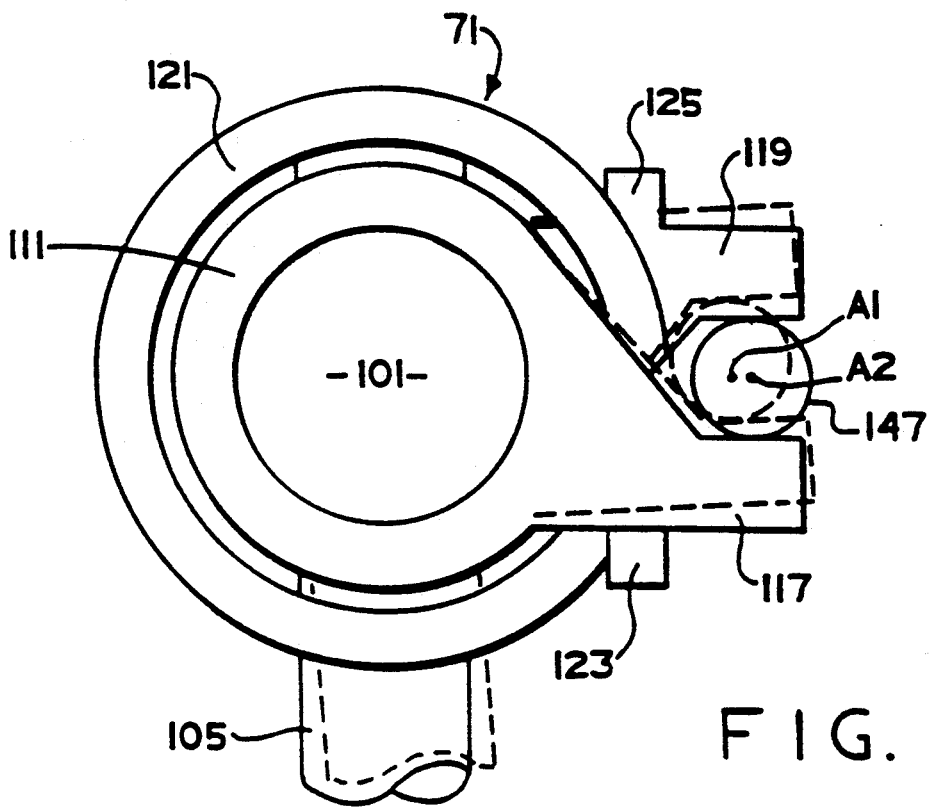
FIG. 12 is an enlarged, fragmentary, somewhat schematic view, taken on line 12—12 of FIG. 11, illustrating the adjustability of the alternative embodiment.

Alternative Embodiment—FIGS. 11 & 12

Referring now primarily to FIGS. 11 and 12, there is illustrated an alternative embodiment of the present invention, in which almost all of the elements are the same as in the primary embodiment, and bear the same reference numerals. In FIG. 11, the only change is that the pin 109 has been replaced by a modified pin 109'. The pin 109' permits adjustment of the absolute neutral position of the mechanism, and therefore, of the pin 105, which controls the actual position of the cam ring 67. Preferably, the pin 109' of the alternative embodiment would be used in a pump not having any sort of wideband neutral, thus requiring a more precise setting of absolute neutral.

The pin 109 includes an inner portion 141 and an outer portion 143, the portions 141 and 143 each being rotatable about a common axis of rotation A1. Disposed in threaded engagement with the outer portion 143 is a lock nut 145 so that, when the desired adjustment of the mechanism is achieved, the rotational position of the pin 109' can be locked or fixed, semi-permanently.

The pin 109' also includes an eccentric portion 147, which defines and axis of rotation A2. In the initial, normal rotation position of the pin 109', the axis A2 of the eccentric portion 147 is transversely offset from the axis A1 (see the solid-line view of the eccentric portion 147 in FIG. 12).

In that position of the pin 109', the mechanism is in the solid-line position in FIG. 12. If that position of the neutral centering mechanism 71 is not achieving absolute neutral, the lock nut 145 may be loosened, and the pin 109' rotated, for example, such that the eccentric portion 147 moves to the dashed-line position in FIG. 12. This effectively raises both of the fixed stop surfaces (not labeled in FIG. 12), thus rotating the parts of the mechanism 71 to the dashed-line position shown in FIG. 12. For ease of illustration in FIG. 12, the amount of movement resulting from the adjutability has been exaggerated, but it is believed to be within the ability of those skilled in the art to select the appropriate eccentricity of the portion 147 to achieve whatever amount of adjustment is needed in the neutral position of the cam ring 67.

It will be apparent to those skilled in the art that adjustability of the type illustrated in FIG. 12 may be accomplished in other ways. For example, the adjustment of the fixed stop surfaces in FIG. 12, either upward or downward as required, could be accomplished by moving the pin 109 linearly, either upward or downward as required, such as by means of a screw-thread adjustment.

One of the advantages of the neutral centering mechanism of the present invention is the simplicity, compactness, and low cost of manufacture. Preferably the actuator members 111 and 113 are substantially identical, i.e., only a single part number is required, with each mechanism using two of that particular part number. In addition, the actuator members 111 and 113 may be powdered metal parts, requiring relatively little machining, while the pin 115 and the pin 109 would be relatively simple, inexpensive centerless ground parts.

Figure 13:
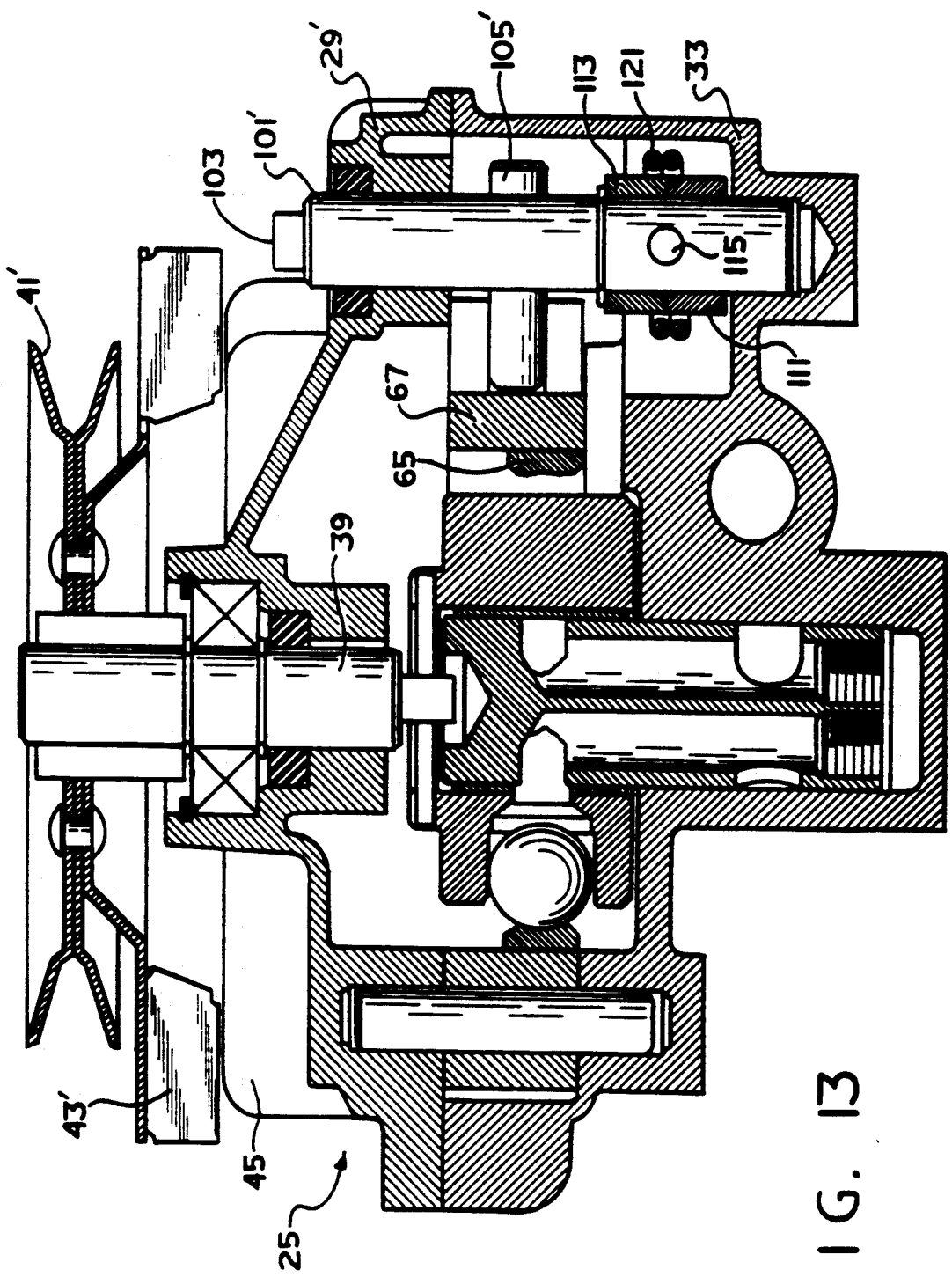
FIG. 13 is a transverse cross-section, similar to FIG. 3, illustrating an alternative embodiment of the present invention.

Alternative Embodiment—FIG. 13

Referring now to FIG. 13, which is a section generally similar to FIG. 3, several differences may be seen. In the embodiment of FIG. 13, there is a modified pulley 41' which includes a one-piece, stamped cooling fan 43', which is disposed axially between the pulley 41' and the pump 25, and is riveted to the pulley 41' to be a single-piece assembly.

As mentioned previously, the other primary difference in the embodiment of FIG. 13 is that there is a modification of the pump cover 29 and the manifold body 33', to receive therein a modified control shaft 101', having its axis of rotation oriented parallel to the axis of the input shaft 39. There is also a difference in the overall arrangement of elements on the control shaft 101'. The actuator members 111 and 113, and the pin 115, all of which are identical to the primary embodiment, are disposed toward the lower end of the control shaft 101'. A modified pin 105' is, in the embodiment of FIG. 13, disposed toward the middle of the control shaft 101', and extends radially therefrom directly into an appropriate opening in the cam ring 67. The remaining structure and function of the neutral centering mechanism is the same in the embodiment of FIG. 13 as in the primary embodiment. With the embodiment of FIG. 13, it is possible to simplify somewhat the interconnection between the control shaft 101' and the cam ring 67 by orienting the control shaft 101' parallel to the pump input shaft 39.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. A variable displacement hydraulic device of the type including a fluid displacement mechanism and means operable to vary the displacement of the displacement mechanism in response to rotation of a control shaft about its axis of rotation, from a neutral position to a first operating position, and from the neutral position, in an opposite direction, to a second operating position; control means operatively associated with said control shaft to rotate said control shaft between said first and second operating positions; a neutral centering mechanism operable to return said control shaft to said neutral position in the absence of actuation movement by said control means; said neutral centering mechanism being characterized by:

(a) said control shaft defining a reference plane oriented generally perpendicular to an axis of rotation defined by said control shaft;

(b) means defining first and second fixed stop surfaces disposed transversely adjacent said control shaft;

(c) first and second substantially identical actuator members disposed about said control shaft, and being arranged generally in a mirror image relative to each other, about said reference plane, said first and second actuator members defining first and second movable stop surfaces, respectively, disposed to be in engagement with said first and second fixed stop surfaces, respectively, when said control shaft is in said neutral position;

(d) spring means biasing said first actuator member counter-clockwise, biasing said first movable stop surface toward engagement with said first fixed stop surface, and biasing said second actuator member clockwise, biasing said second movable stop surface toward engagement with said second fixed stop surface; and (e) means operable to transmit counter-clockwise rotation of said control shaft into counter-clockwise rotation of said first actuator member, in opposition to the biasing force of said spring means, and means operable to transmit clockwise rotation of said control shaft into clockwise rotation of said second actuator member, in opposition to the biasing force of said spring means.

2. A variable displacement hydraulic device as claimed in claim 1, characterized by said means defining said first and second fixed stop surfaces is adjustable such that the rotational position of said control shaft corresponding to said neutral position is adjustable.

3. A variable displacement hydraulic device as claimed in claim 1, characterized by said fluid displacement mechanism comprises a rotor and said means to vary the displacement of said displacement mechanism comprises a cam ring surrounding said rotor and being pivotable about a cam pivot means.

4. A variable displacement hydraulic device as claimed in claim 3, characterized by said means to vary the displacement of said displacement mechanism further comprises means operable to transmit rotation of said control shaft into pivotal movement of said cam ring.

5. A variable displacement hydraulic device as claimed in claim 1, characterized by said each of said first and second actuator members comprises a generally annular portion defining an axis of rotation adapted to coincide generally with the axis of rotation of said control shaft, said annular portion being in a close-fit relationship about said control shaft.

6. A variable displacement hydraulic device as claimed in claim 5, characterized by said first and second actuator members including first and second stop portions, respectively, extending generally radially from said annular portion, and defining said first and second movable stop surfaces, lying in planes oriented generally parallel to said axis of rotation defined said actuator members.

7. A variable displacement hydraulic device as claimed in claim 1, characterized by said spring means comprises a single torsional spring member having first and second opposite end portions, engaging said first and second actuator members, respectively, first and second opposite end portions biasing said first and second actuator via members said first and second movable stop surfaces, about the axis of rotation of said control shaft.

8. A variable displacement hydraulic device as claimed in claim 7, characterized by said torsional spring member comprising a generally cylindrical coiled spring portion, said first and second actuator members being disposed axially adjacent each other, said cylindrical coiled spring portion being disposed at least partially surrounding said actuator members.

9. A variable displacement hydraulic device as claimed in claim 1, characterized by said means operable to transmit rotation of said control shaft into rotation of said actuator members comprises said first and second actuator members defining first and second actuation surfaces, respectively, and said control shaft including means extending radially therefrom and disposed to be in engagement with said first and second actuation surfaces when said control shaft is in said neutral position.

10. A variable displacement hydraulic device as claimed in claim 9, characterized by said radially-extending means remains in engagement with said first actuation surface, but is disengaged from said second actuation surface as said control shaft is rotated from said neutral position toward said first operating position.

11. A variable displacement hydraulic device as claimed in claim 10, characterized by said radially-extending means remains in engagement with said second actuation surface, but is disengaged from said first actuation surface as said control shaft is rotated from said neutral position toward said second operating position.

12. A variable displacement hydraulic device as claimed in claim 1, characterized by said means defining said first and second fixed stop surfaces comprises an elongated member being oriented generally parallel to said axis of rotation of said control shaft, an outer surface of said elongated member defining said first and second fixed stop surfaces.

13. A variable displacement hydraulic device as claimed in claim 12, characterized by said first and second fixed stop being disposed on opposite sides of said elongated member, said first and second movable stop surfaces being disposed in a facing relationship, relating to each other when said control shaft is in said neutral position.

14. A variable displacement hydraulic device as claimed in claim 12, characterized by said elongated member comprises a generally cylindrical member, having a generally cylindrical outer surface, a first portion of said outer surface defining said first fixed stop surface, and a second portion of said outer surface, diametrically disposed from said first portion, defining said second fixed stop surface.

15. A variable displacement hydraulic device as claimed in claim 14, characterized by said elongated member defining a fixed axis of rotation, fixed relative to said axis of rotation of said control shaft, and further comprising a generally cylindrical eccentric portion defining a movable axis of rotation disposed eccentrically relative to said fixed axis of rotation, said eccentric portion defining said fixed stop surfaces, whereby rotation of said elongated member moves said fixed stop surfaces in a direction generally perpendicular to said axes of rotation.

* * * * *